(No Model.)
C. L. DEXTER.
HERMETICALLY SEALED PACKAGE FOR CONTAINING ICES, &c.
No. 519,839. Patented May 15, 1894.
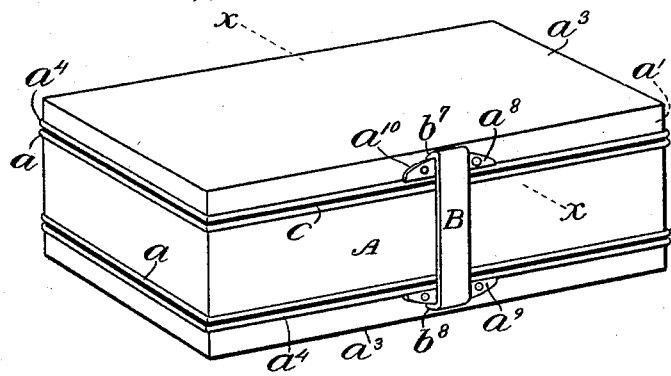
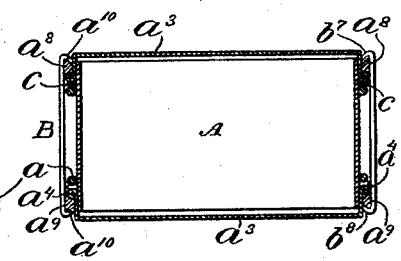
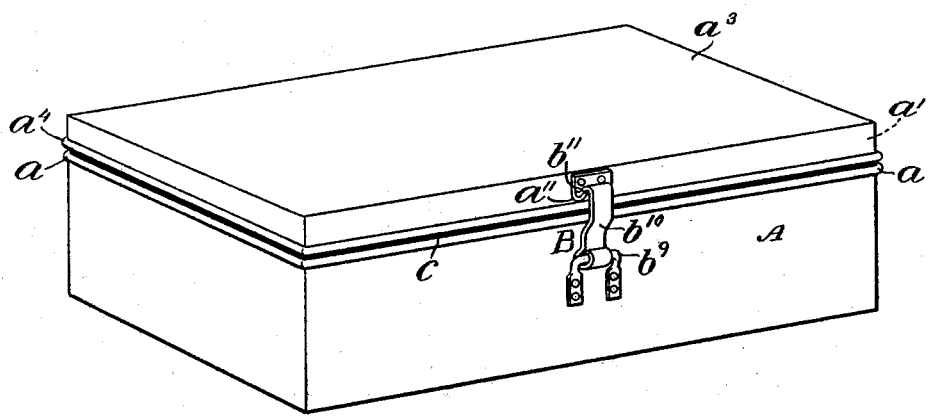
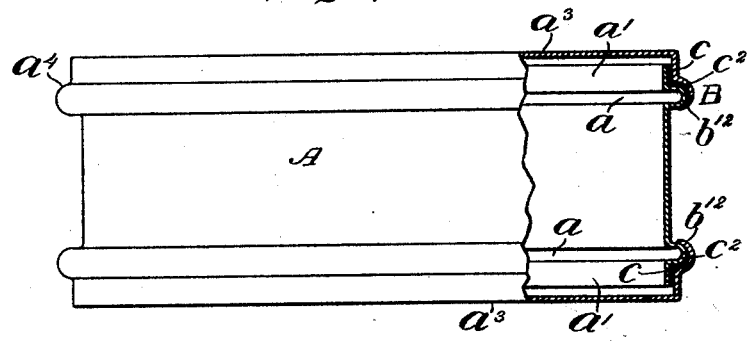
Witnesses:
Richard C. Maxwell.
W. A. Schaefer.
Inventor.
Charles L. Dexter,
by J. Walter Douglass
Attorney.

UNITED STATES PATENT OFFICE.

CHARLES L. DEXTER, OF PHILADELPHIA, PENNSYLVANIA.

HERMETICALLY-SEALED PACKAGE FOR CONTAINING ICES, &c.

SPECIFICATION forming part of Letters Patent No. 519,839, dated May 15, 1894.

Application filed September 16, 1893. Serial No. 485,675. (No model.)

*To all whom it may concern:*

Be it known that I, CHARLES L. DEXTER, a citizen of the United States, residing at the city of Philadelphia, in the county of Philadelphia and State of Pennsylvania, have invented certain new and useful Improvements in Hermetically-Sealed Packages for Containing Ices, Cream, or the Like, of which the following is a specification.

My invention relates to a hermetically sealed holder for containing frozen ices, cream or the like for shipment and so arranged as to prevent saline or other extraneous matter in solid or liquid form from contacting with the contents of the package.

Hitherto it has been found a difficult matter to maintain frozen ices, cream or the like in packages absolutely free from matter in which packed for shipment and different expedients have been resorted to with a view of preventing access of the saline matter in liquid or other form to the internal contents of the package. It is well known that in many instances the contents of a package have been ruined by the entrance of the saline matter and ice in which such package is packed for shipment into the interior thereof, entailing thereby not only loss pecuniarily to the purveyor, but dissatisfaction to those catered to by such a person.

The principal object of my present invention is to obviate the above mentioned disadvantageous features and to provide an efficient and comparatively inexpensive hermetically sealed holder for ices or cream in a frozen state for shipment and subsequent use therefrom, and so arranged as to be maintained hermetically sealed from the influence of saline or other extraneous matter.

My invention consists of a hermetically sealed holder adapted for frozen ices, cream or the like constructed and arranged in the manner hereinafter described and claimed.

The nature and scope of my invention will be more fully understood from the following description taken in connection with the accompanying drawings, forming part hereof, and in which—

Figure 1, is a perspective view of an oblong holder adapted for containing frozen ices, cream or the like and provided with clamping means engaging the top and bottom flanged cover of the holder for hermetically sealing the same. Fig. 2, is a transverse sectional view on the line $x$—$x$, of Fig. 1. Fig. 3, is a perspective view of a holder with a detachable flanged cover and a slightly modified form of means for clamping the cover to said holder; and Fig. 4, is a view partly in side elevation and partly in broken section of a still further modified form of holder provided with means for clamping the cover to the body of the holder.

Referring to the drawings with reference to Figs. 1 and 2, A is the holder which comprises an oblong can provided with top and bottom flanges or beads $a$, formed with the rims $a'$. $c$, are gaskets of rubber or other preferred material engaging the respective beaded rims $a'$, of the holder. $a^3$, are top and bottom covers provided respectively with beaded edges $a^4$, and with centrally disposed inclined lugs or projections $a^8$ and $a^9$, with rear recesses or tapering grooves $a^{10}$, as clearly illustrated in Fig. 2, for engaging the detachable clamping device B, which consists of a strip having inner flaring top and bottom lips or tongues $b^7$ and $b^8$. This clamping device B, on each side or end of the holder A, is caused to engage with the inclined lugs or projections $a^8$ and $a^9$, of the covers $a^3$, and are pressed by hand until they respectively occupy the positions illustrated in Figs. 1 and 2, when the respective covers will thereby be held to the body of the holder in such manner as to prevent any extraneous matter gaining access to the interior of the holder, yet at the same time so arranged as to permit of the removal of the same by the disengagement of the clamping device B, from the lugs or projections $a^8$ and $a^9$, connected with the rims of the covers and resting against the beaded portions thereof, as clearly illustrated in Figs. 1 and 2, of the drawings.

In Fig. 3, the holder A, is provided with but one detachable cover $a^3$, with a beaded edge $a$, and a catch $a^{11}$, on each side or end thereof. The clamping device B, in this instance is pivoted to bearings $b^9$, secured to the body of the holder and consisting of a metal catch $b^{10}$, with a flaring tongue $b^{11}$, arranged so as to be readily sprung into engagement with the catch $a^{11}$, adapted therefor and connected with the outside surface of the cover $a^3$, as clearly illustrated in Fig. 3, and in order to support the cover firmly to position in contact with the gasketed rim $a'$, of the holder A.

In Fig. 4, the holder A, is provided with beaded top and bottom rims having a clamping device B, which in this instance is formed integral with each cover $a^3$, and consists of a spring clip or clamp $b^{12}$, adapted to engage the beaded rims $a'$, formed integral with the body of the holder A, at the top and bottom thereof and with detachable gaskets $c$, of rubber or other preferred material with skirts $c^2$, conforming to and hugging against the rims of the holder A, so as to hermetically seal the respective covers $a^3$, thereto while in normal position in connection with the holder, as illustrated and thus to prevent extraneous matter gaining entrance into the interior of the holder. It will be observed that in this instance the clamping device B, is sprung onto the gasketed rim of the holder in such manner as to form a perfectly tight union with the members of the holder.

Having thus described the nature and objects of my invention, what I claim as new, and desire to secure by Letters Patent, is—

1. A metal holder provided with a beaded rim having a gasket applied thereto, a cover having a beaded rim, a device connected with one member of said holder and adapted to serve as a means for permitting of the hermetical sealing of the other member provided with a clamp, when the said clamp is brought into engagement with said device the arrangement being such that said clamp does not extend beyond the top and bottom planes of said holder, substantially as and for the purposes set forth.

2. A metal holder provided with beaded top and bottom rims having flexible gaskets applied thereto, covers having rims conforming to the shape of the beaded rims of said holder and adapted to be sprung onto the gasketed surfaces thereof and held hermetically sealed thereto, substantially as shown, and for the purposes set forth.

In witness whereof I have hereunto set my signature in the presence of two subscribing witnesses.

CHARLES L. DEXTER.

Witnesses:
 THOMAS M. SMITH,
 RICHARD C. MAXWELL.